No. 703,578. Patented July 1, 1902.
B. M. W. HANSON & F. W. GORDON.
GEAR TUMBLER.
(Application filed Mar. 24, 1902.)
(No Model.) 2 Sheets—Sheet 1.

Witnesses:
E. R. Shipley.
M. S. Belden.

Inventors:-
Bengt M. W. Hanson
Frederick W. Gordon
by James W. See Attorney

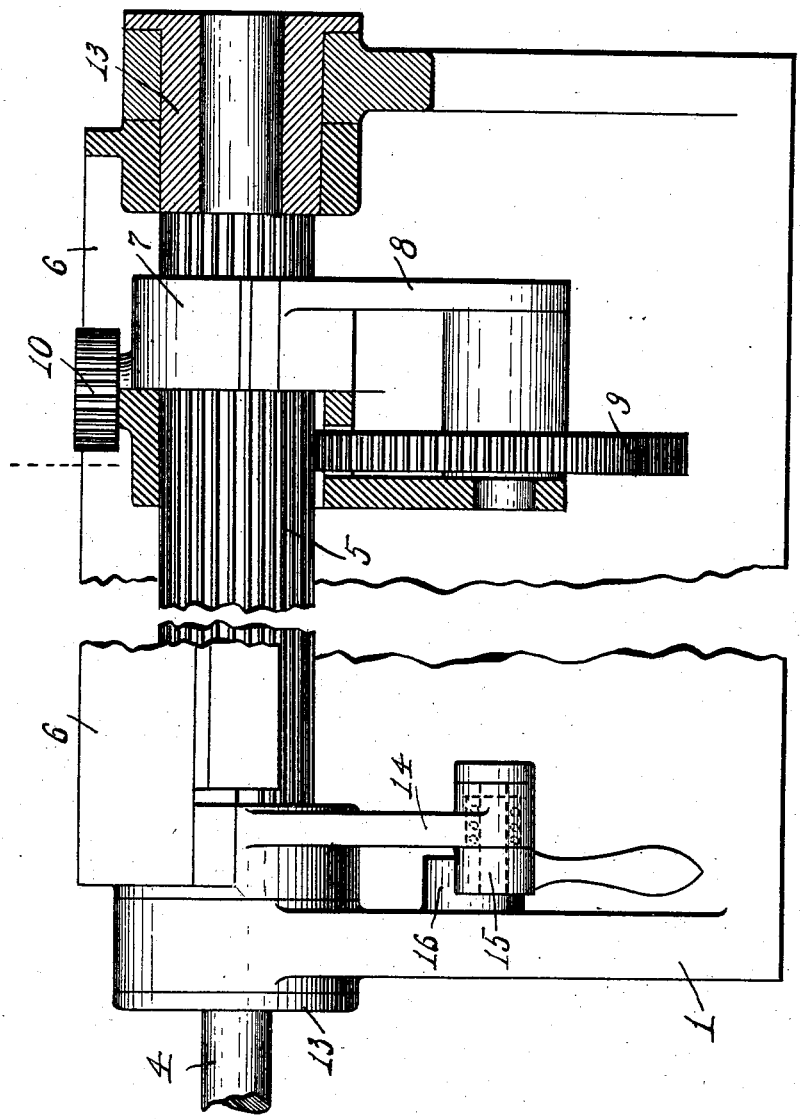

UNITED STATES PATENT OFFICE.

BENGT M. W. HANSON AND FREDERICK W. GORDON, OF HARTFORD, CONNECTICUT, ASSIGNORS TO PRATT & WHITNEY COMPANY, OF HARTFORD, CONNECTICUT.

GEAR-TUMBLER.

SPECIFICATION forming part of Letters Patent No. 703,578, dated July 1, 1902.

Application filed March 24, 1902. Serial No. 99,580. (No model.)

*To all whom it may concern:*

Be it known that we, BENGT M. W. HANSON, a citizen of Sweden, and FREDERICK W. GORDON, a citizen of the United States, both residing at Hartford, Hartford county, Connecticut, have invented certain new and useful Improvements in Gear-Tumblers, of which the following is a specification.

There is a common class of gearing for transmitting variable speeds and involving one shaft carrying a plurality of diversely-sized gears, a second shaft carrying one or more gears, and an angularly and longitudinally-adjustable tumbler carrying one or more intermediate gears always in motion from the gear on the second shaft and adapted to be thrown into engagement with any selected gear on the first shaft.

Our present invention relates to improvements in the adjustable gear-tumbler in such devices, and it is applicable to most of the situations in which transmission devices of the above-mentioned class are employed.

The improvement will be readily understood from the following description, taken in connection with the accompanying drawings, in which—

Figure 1:
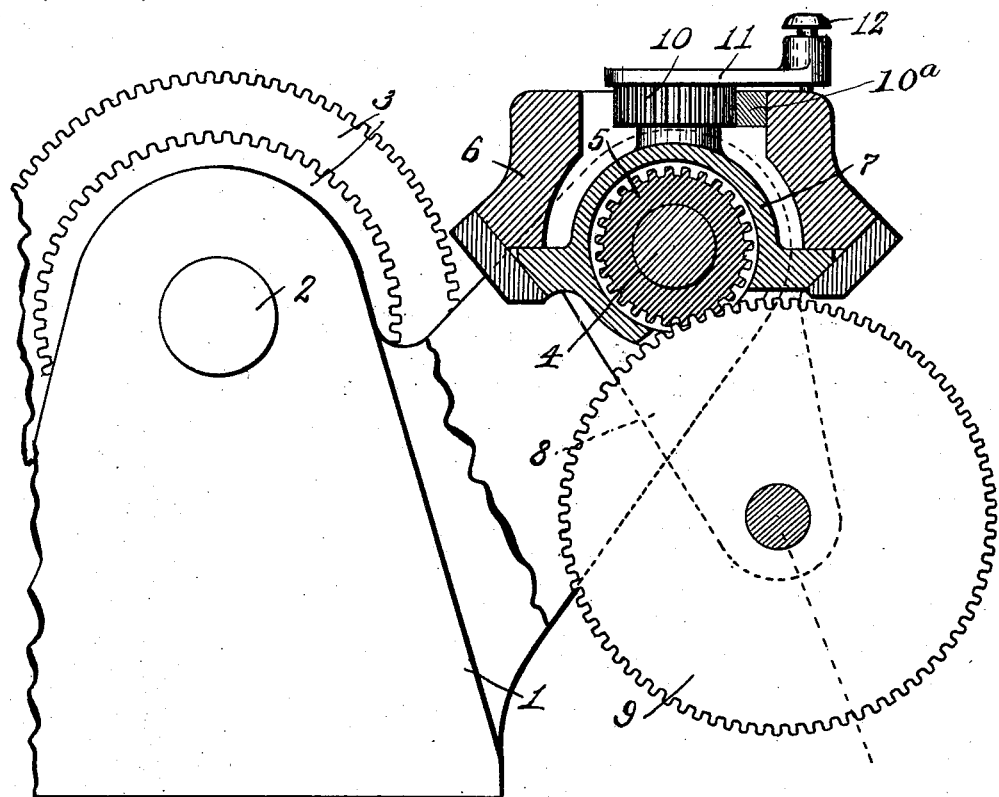
Figure 2:
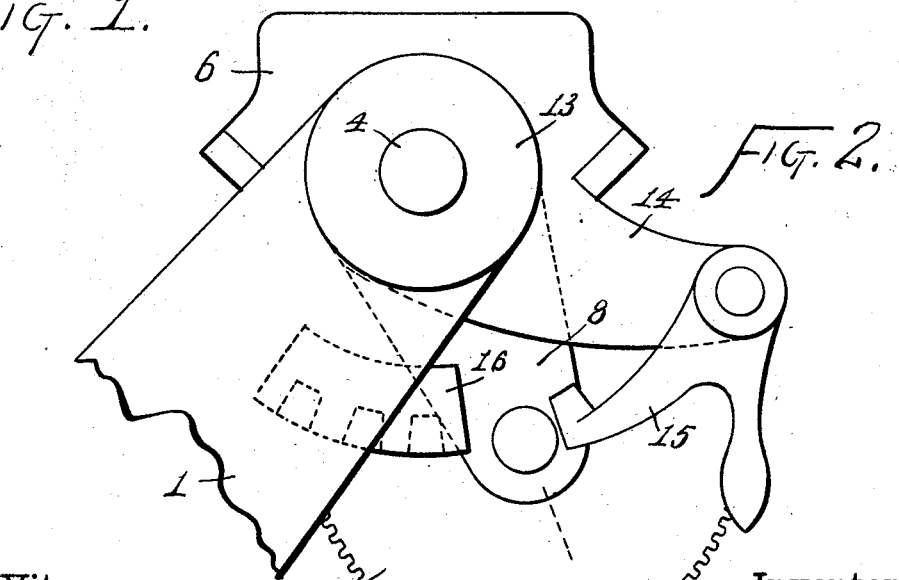

Figure 1 is a vertical transverse section of our improved tumbler, shown in connection with an exemplifying plurality of gears with which the tumbler-gear is to be engaged; Fig. 2, an end elevation of the same; and Fig. 3, a side elevation of the tumbler, part vertical longitudinal section.

In the drawings, 1 indicates the framing to furnish the fixed bearings for the device; 2, an exemplifying-shaft, constituting one of the pair of shafts involved in the general system; 3, a plurality of gears on shaft 2, their sizes being diverse; 4, a shaft with its axis parallel to that of shaft 2 and constituting the second shaft of the pair involved in the general system, the present specification considering shaft 4 as the driving-shaft of the pair and shaft 2 as the driven shaft, though it is to be understood that it is quite immaterial which of the two is employed as the driver and which as the driven; 5, a long pinion formed on or fast on shaft 4 and having a length corresponding with that of the series of diversesized gears upon shaft 2; 6, a slotted guideway disposed parallel with shaft 4 and partly inclosing it and having at its ends journal-bearings concentric with the axis of shaft 4; 7, a tube loosely surrounding long pinion 5 and having wings engaging the guideway, so that the tube may be adjusted along the guideway and long pinion; 8, a pair of arms projecting rigidly from tube 7 in a substantially radial direction and at such distance apart as will permit of the presence of the intermediate gearing of the system; 9, an intermediate gear carried by arms 8 and constantly engaging long pinion 5 and adapted by the turning of the guideway to be swung into engagement with a selected one of the gears upon shaft 2; 10, a pinion journaled upon tube 7 and engaging a rack upon the guideway 10ª, the rack referred to; 11, a crank upon the pinion; 12, a detent-pin carried by the crank and adapted to engage suitable detent-holes in the guideway in such obvious manner that the turning of the crank and pinion causes the tube and intermediate gear to traverse the guideway and long pinion to bring the intermediate gear into line with a selected one of the gears upon shaft 2 and to be locked in that position; 13, bushings carried by the framing 1 and furnishing bearings for shaft 4 and projecting inwardly from the framing to furnish journals for the bearings at the ends of guideway 6; 14, an arm projecting transversely from the guideway; 15, a latch pivoted to arm 14, and 16 a series of detent-recesses supported by the framing and adapted to be engaged by the latch and hold the guideway in selective angular positions corresponding with the angular adjustment of the intermediate gear to bring it into proper relationship with the selected gears on shaft 4.

In the drawings the intermediate gear is shown in inactive position, free from any of the gears upon shaft 2. The carriage of the intermediate gear, formed by the tube and its arms, may be traversed along the guideway till the intermediate gear is in line with the selected gear which it is to engage, after which the carriage may be locked in the guideway by any suitable means to prevent endwise displacement. The guideway may then be rocked upon its axis to swing the intermediate gear into engagement with the selected gear and be locked in such angular position of adjustment by means of the latch.

We claim as our invention—

In a gear-tumbler, the combination, substantially as set forth, of a shaft, a long pinion carried thereby, a slotted guideway disposed parallel with said shaft and partly inclosing said pinion, journal-bearings at the ends of the guideway and supporting same on an axis coincident with that of said shaft, a tube encircling said long pinion and having wings engaging the guideway, arms projecting from said tube, a gear journaled in said arms and engaging said long pinion, and means for locking the tube and guideway in adjusted positions.

BENGT M. W. HANSON.
FREDERICK W. GORDON.

Witnesses:
W. M. STORRS,
CHAS. V. MURGO.